United States Patent [19]

Schmalfuss et al.

[11] Patent Number: 4,724,479
[45] Date of Patent: Feb. 9, 1988

[54] SHIELDED, HIGHLY RADIOACTIVE, WET CHEMICAL CELL FOR AN ATOMIC PLANT WITH A CONTRIVANCE FOR DRIP LEAKAGE RECOGNITION AND METHOD FOR USE IN A CELL OF THIS TYPE

[75] Inventors: Harald Schmalfuss, Rodgau; Bernhard Schneider, Hofheim/Langenhain; Friedel Sinsel, Frankfurt am Main, all of Fed. Rep. of Germany

[73] Assignee: Deutsche Gesselschaft fur Wiederfarbeitung von Kernbrennstoffen mbH, Hanover, Fed. Rep. of Germany

[21] Appl. No.: 717,309

[22] Filed: Mar. 29, 1985

[30] Foreign Application Priority Data

Mar. 29, 1984 [DE] Fed. Rep. of Germany ....... 3411721

[51] Int. Cl.$^4$ .............................................. H04N 7/18
[52] U.S. Cl. .................................. 358/100; 358/106; 376/248; 376/250; 340/605; 356/369
[58] Field of Search ................. 388/93, 100, 101, 107, 388/106; 376/248, 250, 251; 340/605; 250/225; 356/369

[56] References Cited

U.S. PATENT DOCUMENTS 4,464,332 8/1984 Boisseuil et al. ..................... 376/248
4,467,212 8/1984 Olcott ................................. 358/106

Primary Examiner—Howard W. Britton
Assistant Examiner—John K. Peng
Attorney, Agent, or Firm—Paul L. Sjoquist

[57] ABSTRACT

A method and apparatus for detecting leakage in a shielded, radioactive hot cell having drip leakage-endangered sections, including a light source and polarizing element for irradiating the leakage-endangered sections with light, reflecting the light to a polarized photosensitive receiver, and an apparatus for comparing the received and reflected light with a threshhold value and for sounding an alarm whenever the comparison exceed predetermined limits. The method constitutes the steps for practicing the operation of the apparatus.

16 Claims, 2 Drawing Figures

1

SHIELDED, HIGHLY RADIOACTIVE, WET CHEMICAL CELL FOR AN ATOMIC PLANT WITH A CONTRIVANCE FOR DRIP LEAKAGE RECOGNITION AND METHOD FOR USE IN A CELL OF THIS TYPE

BACKGROUND OF THE INVENTION

The invention relates to a shielded, highly radioactive, wet chemical cell of an atomic plant, in particular a large cell of reprocessing plants for irradiated atomic fuel. These types of cells are hereinafter called hot cells.

The invention relates in particular to a method for recognizing (detecting) drop leaks in drip leakage-endangered sections of system parts of hot cells, wherein the drip leakage-endangered sections, at least in the region of the possible path of a leakage drop, are irradiated with light and the radiation reflected from the irradiated region is evaluated for drip leakage recognition.

The invention also relates to a hot cell with a contrivance for recognition of drip leakage in drip leakage-endangered sections of the hot cell. Here, the contrivance displays a source of light capable of being directed toward the region of the possible path of a leakage drop and an arrangement for evaluation of the radiation reflected from the irradiated region for the purpose of drip leakage recognition.

The initially mentioned hot cell, as well as the method and the contrivance for drip leakage recognition, are known from the German Offenlegungsschrift* No. 31 38 484 of the applicant. In the known hot cells of this species and/or in the case of the known method of this species, drip leakages are traced by arranging remote controlled television cameras on computer controlled manipulators, by traveling over the leakage point-endangered region of the hot cell by the television camera under computer control, and the pictures displayed by the television camera are examined for leakage points.

*Offenlegungsschrift=laid open print, published patent application (specification) examined only as to obvious defects but not as to patentability.

This teaching that is known from German Patent No. 31 38 484 Al has a series of advantages. It enables automatic checking of the leakage point-endangered regions, for example the frequently 3000 to 4000 flange connections in a hot cell. It moreover enables a search for leaks without personnel having to enter the hot cells for this purpose. In this manner, preliminary decontamination work becomes superfluous, having as its consequence a considerable saving of time in the search for leakage. To locate larger leaks, the known contrivance is the best suited. However, small drip leakages when making a visual evaluation of the pictures displayed by the television camera are frequently overlooked.

SUMMARY OF THE INVENTION

Starting out from the aforementioned state of the art, the teaching in accordance with the invention concerns itself with the problem of further developing the hot cell of the known species and/or the known species method by means of which, while retaining as much as possible the previously obtained advantages, even smaller drip leakages are capable of being detected in the drip leakage-endangered regions being examined.

Relative to the method, this task is resolved by the fact that checked are only drip leakage-endangered sections whose surfaces, located in the area to be irradiated, reflect impinging radiation in a directed fashion, that impressed onto the light prior to its impingement on the surfaces of the regions to be irradiated is a defined polarization, and that the status of the polarization of the radiation reflected (remitted) is examined within a predetermined angle of reflection.

Relative to the apparatus, this task is resolved by the fact that in the hot cell the surfaces of the regions of the drip leakage-endangered sections to be irradiated are machined such that they reflect radiation in directed fashion, and that there is provided a polarization arrangement for defined polarization of the light prior to its striking the regions to be irradiated; furthermore, there is an arrangement disposed in the radiation path of the beam reflected from the irradiated region for determining the polarization apparatus of the reflected/remitted light within a predetermined angle.

Inclusion of the surfaces of the drip leakage-endangered regions of the hot cell treated in accordance with the invention into the optical measuring arrangement, in conjunction with use of polarized light as the incident radiation, permits immediately recognizing, with great accuracy, depolarizing-acting surface variations of the irradiated regions. These types of depolarizing surface variations are provoked by emerging leakage drops and/or their crusty residues. The crusty residues no longer reflect directed incident light, rather remitting it in diffuse fashion. In doing this, they simultaneously carry out a depolarizing action. The same applies for the leakage drops themselves. Moreover, the teaching in accordance with the invention—like the teaching based on the known species enables an automatic search for leakage. Therefore, personnel need no longer enter into the hot cells when searching for leaks.

Preferentially, the intensity of the reflected/remitted radiation, after running through an analyzer that is preferentially disposed in a blocking direction to the polarizer, is detected photometrically, for example with the aid of an observation camera. For automatic recognition of drip leakage, the intensity distribution of the photometrically detected radiation is preferentially compared with a predetermined reference intensity distribution and, in the case of exceeding a likewise predetermined threshold deviation between the two intensity distributions, an alarm is triggered. In doing this, a digital processing of the intensity distributions enables a rapid processing of data.

Investigations by the applicant have yielded that a white light source is particularly suited as the source of light. Basically, however, laser light sources can also be brought in, which have the advantage that, as a rule, they already emit polarized light.

In accordance with another preferred example of embodiment, rapid recognition of "falling" leakage drops is accelerated by the fact that the region to be irradiated displays, at its lowest point in the direction of the gravitation field, an auxiliary reflector that is disposed, in the direction of the incident radiation, behind the possible path of the falling leakage drop. Also, the surface of the auxiliary reflector is treated such that it reflects light in directed fashion.

In accordance with another preferred example of embodiment, a possibly emerging leakage drop is guided onto a compulsory path. If, for example, the drip leakage-endangered region is a flange, then this compulsory path can be realized by providing, in a part of the flange external to the sealing area, a collecting trough that is connected through a boring with an outlet located thereunder, in the direction of the gravitation field. This measure narrows the region to be searched for drip leakage to a minimum of space. It is particularly advantageous in the case of horizontally positioned flange connections.

In the case of large angles of reflection, depolarization of the impinging beam cannot always be excluded. For this reason, in accordance with another preferred form of embodiment of the invention, the reflected/remitted radiation is measured only within a small angle of reflection. Additionally, the observation camera and the light source are rigidly joined together with a slight, mutual interval between them.

In further development of the basic idea in accordance with the invention, for automatic leakage search inside of a hot cell, the illumination system and the imaging system are firmly attached to a computer controlled, mobile carrier system as is, for example, known per se from manipulators for hot cells. Additionally provided is a control computer. In further development of this form of embodiment of the invention, the illumination system and/or the imaging system and/or the picture evaluation arrangement are laid out such that their working parameters are capable of being remotely controlled, preferentially from the aforementioned control computer.

BRIEF DESCRIPTION OF THE DRAWINGS

The invention will be explained in more detail in the following with the aid of examples of embodiment, making reference to the strongly, schematically illustrated drawings that are attached. Shown in the drawings are.

DESCRIPTION OF THE PREFERRED EMBODIMENTS

The same reference numbers are used in all figures for parts that are functionally the same. Modifications of parts that are the same are identified by an apostrophe after the reference number.

Figure 1:
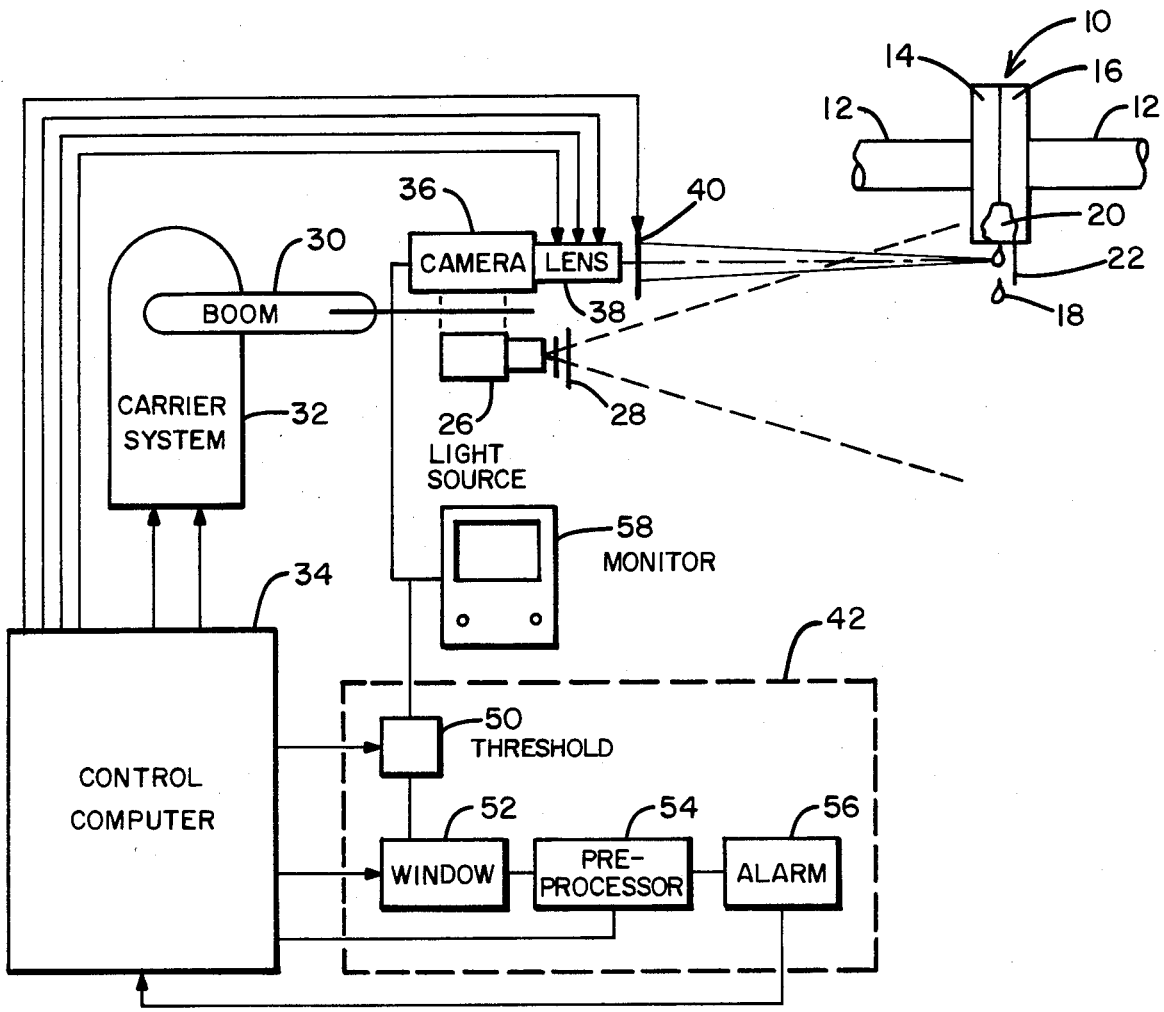
FIG. 1 a schematic representation of a first example of embodiment, partially in the form of a block diagram.

In accordance with the example of embodiment represented in FIG. 1, one of the drip leakage-endangered sections of the hot cell consists of a flange connection 10. Coupled together in known manner with the flange connection 10 are two transport tube conduit ends 12, via the flange parts 14 and 16. In the example of embodiment illustrated, the transport tube conduit ends 12 run horizontally; accordingly, the flange connection 10 vertically. Serving as the flange material is face-turned stainless steel. Its surface is machined such that it reflects impinging light in directed fashion—therefore does not remit it in diffuse fashion. These surface properties apply at least for the region of the connecting seam of the two flange parts 14 and 16.

Used as the transport liquid inside the piping system is Uranylnitrate in acid solution ($HNO_3$).

Now, if the flange connection 10 shows up a leak, transport liquid, possibly including substances found therein, comes out of the seams of the two flange parts 14 and 16 and drips downwardly in an essentially vertical direction. Depositing themselves on the flange connection, on the downward path of the leakage drop 18, are crusty residues 20, preferentially in the region of the aforementioned seam. Investigations by the applicant have yielded that the crusty residues no longer reflect impinging light in a directed fashion, remitting it rather in diffuse fashion. Additionally, the crusty residues 20 depolarize impinging polarized light.

Additionally disposed in the vertical direction at the lower end of the flange connection 10 is an auxiliary reflector 22. Its surface displays essentially the same optical properties as the surface of the flange connection 10; therefore, in particular, reflects in directed fashion radiation impinging upon it. The auxiliary reflector 22 is disposed in the direction of the beam path of a radiation directed from a source of light 26 toward the flange connection 10, behind the falling drops 18.

Serving as the source of light 26 is a halogen lamp which, with the aid of projection optics (slide projector), beams white light onto the flange connection 10 and the auxiliary reflector 22. Disposed behind the source of light 26 is a polarization filter 28 that linearly polarizes the irradiated light.

The source of light 26 is rotatably and displaceably attached on a boom 30 of a carrier system 32 capable of being controlled in its movement by computer. The carrier system 32 can, for example, be a carrier system, known per se, for modulators in hot cells. The translation and rotation movement of the source of light 26 can be controlled by means of a control computer 34. The source of light serves for optimal illumination of the drip leakage-endangered region in the hot cell to be traveled over by the carrier system 32.

Attached to the boom 30, a small distance away from the source of light 26, is an observation camera 36. Capable of being used as an observation camera is a standard industrial television camera. The observation camera 36 is also displaceably and rotatably disposed by means of the control computer 34 on the boom 30. The camera objective 38 has a focal length that is adjustable over a wide range, constructed, therefore, as an example, as a macrozoom (f=75 to 210 mm). The focal distance of the objective 38, the shutter and the (depth) sharpness of the system imaged by the observation camera 36 can also be changed via the control computer 34. The same applies for the orientation of the throughpass direction of a polarization filter disposed ahead of the objective 38 and serving as the analyzer 40, which is disposed in a blocking position to the polarizer 28.

The controllability of the position of the light source 26 and of the observation camera 36 on the boom 30 additionally serves to maintain the nominal optical magnitudes of the imaging system and the positioning of the polarization filters at the preestablished imaging and illuminating conditions for each drip leakageendangered region to be traveled over inside the hot cell. These preestablished imaging and illuminating conditions, respectively the settings in the imaging system and in the illuminating system required for this, are stored for each drip leakage-endangered region to be traveled over, for example in a memory associated to the control computer 34. We will come back in particular on this in the description of signal processing and picture evaluation, respectively.

The small interval between the source of light 26 and the observation camera 36 guarantees that reflected radiation will impinge into the objective 38 only within a small angle.

The selected optical arrangement, including the system parts of the hot cell, here the flange connection 10, works as follows:

The linearly polarized light irradiated from the source of light 26 over the polarizer 28 is reflected in directed fashion from the blank surfac of the flange connection 10 and of the auxiliary reflector 22 toward the objective 38. In doing this, the polarization status of the light remains essentially unchanged at any time, provided small angles of reflection are maintained. The consequence from this is that, because of the blocking position of the analyzer 40 to the polarizer 28, no light penetrates into the objective 38 when the flange connection 10 is sealed. If, on the other hand, the flange connection 10 is not sealed, there are then crusty residues 20 on its surface, and then the light in this region will be completely depolarized with the result that one part of the depolarized light—as a rule one-half traverses through the analyzer 40 and reaches the objective 38. The fleck of light thereby scanned by the observation camera 36 is then processed in a picture evaluating arrangement 42 connected downstream. A similar effect occurs when the light coming from the auxiliary reflector 22 has to pass through a drop of liquid 18. Additionally, occurring further here is a lens action by the shape of the drops, amplifying the effect. The growing or falling drop 18 is, therefore, likewise capable of being detected as a bright, changing fleck of light. The resulting signal is, in turn, capable of being processed in the picture evaluating arrangement 42.

Another light-amplifying action can be further produced by constructing the auxiliary reflector 22 in half-cylinder shape.

Figure 2:
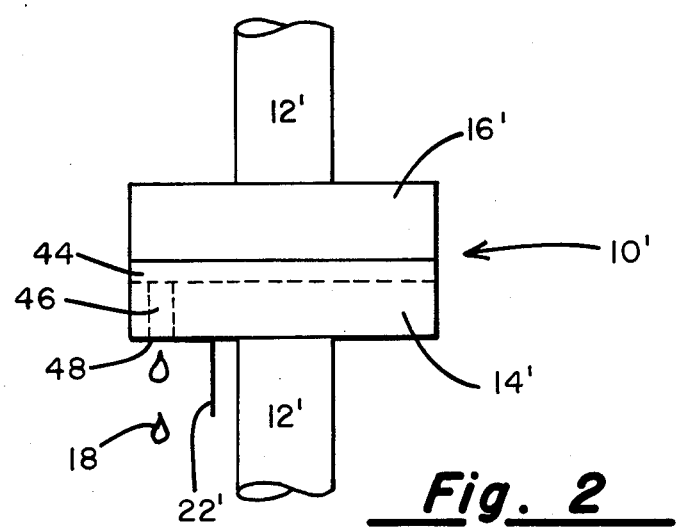
FIG. 2 another example of embodiment for one part of the hot cell in accordance with the invention.

The example of embodiment represented in FIG. 2 starts from a flange connection 10' disposed horizontally in the hot cell and that connects, via a top flange part 16' and a lower flange part 14', two transport tube conduit ends 12' with one another. In order, in this case, to obtain a favorable region for observation of possibly emerging leakage drops, milled in the lower flange part 14', external to the sealing surface, is a collecting trough 44. The collecting trough 44 is connected through a boring 46 with an outlet 48 located, in the gravitation direction, below the collecting trough 44. Like in the case of the example of embodiment represented with the aid of FIG. 1, again provided is an auxiliary reflector 22' disposed behind the outlet 48, in the direction of the incident radiation. This auxiliary reflector is also preferentially constructed as a hollow cylinder—like the auxiliary reflector 22 in accordance with FIG. 1—fabricated from dull (unpolished) VA-steel or white ceramic.

To execute automatic drip leakage recognition, the carrier system 32 together with the illuminating and imaging system is first moved, in a reference phase, through the hot cell under computer control. In this manner, each control position is traveled over and the optimal position for the illuminating and imaging system is determined. The coordinates of this position as well as the section of picture of interest are determined. Moreover, any possible disturbing reflexes still present are interactively marked. All thusly determined data are stored as reference data and any possibly disturbing reflexes still present, or spatial conditions, are stored as reference intensity patterns and, actually in the memory associated to the control computer 34. With the computer controlled carrier systems available today, for example such as those as are used for manipulators in hot cells, repeatable positioning accuracies, relative to the objective, can be traveled over with a location accuracy of about ±1 cm.

In the picture evaluating arrangement 42 illustrated schematically in FIG. 1, the output signal of the observation camera 36 is first fed to an adjustable binary threshold 50 and then digitally evaluated. The binary threshold 50 serves for suppressing light signals, which are for example provoked by ambient light, noises, etc., that are below a predetermined threshold value. The binary threshold 50 is arranged downstream of a picture signal window circuit 52. The picture signal window circuit 52 is laid out and provided for the purpose of masking out interesting sections of picture from the life-sized picture of the observation camera 36. A picture preprocessing circuit 54 arranged downstream of the picture signal window circuit 52, in the direction of data flow, records, statistically, bright flecks of adjustable magnitude in the masked-out section of picture. If the detected, bright flecks exceed a certain size, or a certain intensity, then triggered by means of an alarm circuit 56 is an audible and/or a visual alarm.

Finally, the picture evaluating arrangement 42 compares a reference intensity pattern, which represents a leakage-free condition of the flange connection 10, with the measured intensity distribution. These types of picture evaluating arrangements are known per se and are available on the market, for example under the names S. A. M. of the BOSCH COMPANY, HEIMANN-MBV-SYSTEM, or from other firms such as BBC, SIEMENS, ZEISS, KONTRON and others, without this enumeration raising claim to completeness.

The working parameters of the binary threshold 50, of the picture signal window circuit 52, of the picture preprocessing circuit 54 and of the alarm circuit 56 are also capable of being controlled from the control computer 34.

The picture furnished by the observation camera 36 can also be additionally observed on a monitor 58.

We claim:

1. A method of detecting drip leaks in leakage-endangered sections in shielded and radioactive hot cells of atomic plants, comprising the steps of
    (a) irradiating the leakage-endangered sections with polarized light;
    (b) reflecting the polarized light from irradiated leakage-endangered sections;
    (c) receiving the reflected light in a polarization-sensitive optical receiver;
    (d) comparing the received polarized light with a predetermined threshold light value; and
    (e) actuating an alarm when the compared light and the threshold light values differ by a predetermined amounts.

2. The method of claim 1, wherein the step of reflecting further comprises reflecting at a small angle.

3. The method of claim 1, wherein the step of receiving further comprises passing the reflected light through a polarizer and then detecting the light photometrically.

4. The method of claim 3, wherein the step of comparing further comprises recording the intensity distribution of the photometrically detected light and comparing with a predetermined reference intensity distribution which is the predetermined threshold light value.

5. The method of claim 3, further comprising the step of converting the photometrically detected light into a digital value.

6. The method of claim 1, wherein the step of irradiating further comprises irradiation with a white light source which is polarized.

7. An apparatus for detecting drip leaks in leakage-endangered sections in shielded and radioactive hot cells of atomic plants, comprising
   (a) a source of light and means for polarizing said light and directing said light toward said leakage-endangered sections;
   (b) means from reflecting said light from said leakage-endangered sections;
   (c) means for receiving said reflected light and for determining the polarization status of said reflected light;
   (d) means for comparing said determined polarization status with a predetermined polarization status; and
   (e) means for actuating an alarm when said comparison exceeds predetermined limits.

8. The apparatus of claim 7, wherein said means for reflecting further comprises an auxiliary reflector disposed in the path of said light and behind the possible path of a falling drip leak.

9. The apparatus of claim 7, wherein said leakage-endangered section further comprises a flange having a proximately horizontal sealing surface, and further comprising a collection trough beneath said flange sealing surface, and a bore into said trough and a drip outlet from said bore.

10. The apparatus of claim 7, wherein said means for receiving said reflected light further comprises a polarized optical system coupled to a camera.

11. The apparatus of claim 10, wherien said polarized optical system and camera are closely spaced from said source of light and means for polarizing said light.

12. The apparatus of claim 11, wherein said polarized optical system and said means for polarizing said light are polarizing in mutually different polarization directions.

13. The apparatus of claim 7, wherein said source of light further comprises a source of white light.

14. The apparatus of claim 7, wherein said means for comparing further comprises a threshold circuit having means for suppressing radiation intensities below a predetermined threshold value.

15. The apparatus of claim 7, wherein said means for receiving said reflected light and for determining the polarization status of said reflected light further comprises measuring the light intensity distribution pattern of said reflected light; and said means for comparing further comprises comparing said measured light intensity distribution pattern with a predetermined reference light intensity distribution pattern.

16. The apparatus of claim 11, further comprising a movable carrier system for holding said source of light and means for polarizing said light and said camera; and computer-controlled means for moving said carrier system within said hot cell.

* * * * *